United States Patent

[11] 3,545,533

[72] Inventor James T. Matsuoka
 Brecksville, Ohio
[21] Appl. No. 782,565
[22] Filed Dec. 10, 1968
[45] Patented Dec. 8, 1970
[73] Assignee Intercole Automation, Inc.
 Cleveland, Ohio
 a corporation of Ohio

[54] DISCHARGE DOOR WITH FLUID-CIRCULATING PASSAGES FOR MIXING MACHINE
 6 Claims, 4 Drawing Figs.
[52] U.S. Cl............................................. 165/47;
 165/73; 259/41
[51] Int. Cl........................................... F24h 3/00
[50] Field of Search............................. 165/77, 47,
 72, 73, 34; 259/41(XR), (Inquire)

[56] References Cited
 UNITED STATES PATENTS
 1,122,670 12/1914 Van Houten .................. 165/73
 3,196,845 7/1965 Ganz et al. .................... 165/77
 FOREIGN PATENTS
 949,923 2/1964 Great Britain................ 259/41

*Primary Examiner*—Charles Sukalo
*Attorney*—Watts, Hoffmann, Fisher & Heinke

ABSTRACT: A discharge door for a mixing machine for rubber, plastic and the like with drilled passageways closely adjacent the inside surface of the door and with a chamber in a web that in part connects the door to supporting apparatus, both the passageways and the chamber being constructed for circulation of heat exchange fluid to aid in controlling the temperature of material within the mixer.

PATENTED DEC 8 1970

3,545,533

INVENTOR.
JAMES T. MATSUOKA
BY
Watts, Hoffmann, Fisher & Heinke
ATTORNEYS.

INVENTOR.
JAMES T. MATSUOKA
BY
Watts, Hoffmann, Fisher & Heinke
ATTORNEYS.

INVENTOR.
JAMES T. MATSUOKA
BY
Watts, Hoffmann, Fisher & Heinke
ATTORNEYS.

3,545,533

DISCHARGE DOOR WITH FLUID-CIRCULATING PASSAGES FOR MIXING MACHINE

This invention relates to machines for mixing rubber or plastic material and the like and more particularly to an improved discharge door with passages for circulating heat exchange fluid.

Mixing machines for rubber or plastic and the like in which the material is mixed by rotors in a chamber and then discharged through a door controlled discharge opening are well known. Typically, the temperature of the material being mixed is raised by mechanical working that is effected during mixing and the temperature of the material is usually, at least partially, controlled by the circulation of heat exchange fluid in wall portions of the mixing chambers chamber.

A present trend in the rubber and plastic industry is toward the use of higher powered mixers which generate substantially more heat in the material being mixed during operation, than do present mixers. It is therefore especially important in such mixers that heat exchange fluid be circulated over as great an area of the mixing chamber as possible and also that the heat transfer be extremely efficient. Cored passageways that have often been provided in cast steel components of a mixing machine for the circulation of fluid such as cooling water are difficult to accurately locate and therefore dimensional allowances must be made for variations in core placement. As a result, wall portions of components in which cored passageways are to be formed must be of substantial thickness. For example, cored passageways of the type shown in the discharge door of the mixer disclosed in applicant's U.S. Pat. No. 3,099,040 require a large wall thickness between the passageways and the surface of the door, typically about one and three-fourths inches. This necessarily impairs the efficiency of heat transfer between material in contact with the wall and fluid circulated through the passageways. Also, the relatively rough, unfinished, surfaces of cored passageways create substantial resistance to the flow of heat exchange fluid, reducing the rate at which fluid is circulated and heat exchanged. At the same time, the size of the passageway normally must be kept small to minimize weakening of the part.

It is an object of the present invention to provide an improved discharge door for a mixer of the type referred to in which heat exchange fluid can be circulated at a relatively high velocity adjacent the inside surface of the discharge door that forms a part of the mixing chamber.

It is another object of this invention to provide an improved discharge door for a mixer of the type referred to having interconnected drilled passageways located closely adjacent surface portions of the door that form a part of the mixing chamber, which passageways are accurately located to minimize the distance between the passageways and said surface portions of the door and which have smooth machine machined surfaces to reduce the resistance of the passageways to the flow of heat exchange fluid.

It is a further object of this invention to provide an improved discharge door for a mixer of the type referred to in which a door closure portion and a supporting portion are both constructed to circulate heat exchange fluid.

It is another object of this invention to provide an improved discharge door for a mixer of the type referred to in which a plurality of parallel drilled passageways underlie two convergent cylindrical surfaces of the door which in part define a mixing chamber, said passageways extending axially of the cylindrical surfaces and being divided into two equal sets with the passageways of each set being connected by transverse passageways adjacent opposite ends of the door that are plugged to establish serial flow through each set, separate supply passageways connect each set of passageways in parallel to a source of heat exchange fluid, spaced arms support the door on a pivot shaft for movement between open and closed positions, a curved web extends contiguous with the door between said arms and contains a chamber for the circulation of heat exchange fluid, which chamber is formed by a recess extending substantially the entire distance between the two spaced arms and the entire width of the web, and a cover plate over the recess with spaced inlet and outlet ports, whereby the temperature of the discharge door can be efficiently and effectively controlled by the circulation of heat transfer fluid.

These and other objects, features and advantages of this invention will be apparent from the following detailed description when considered in connection with the accompanying drawings forming a part of this specification and in which.

Figure 1:
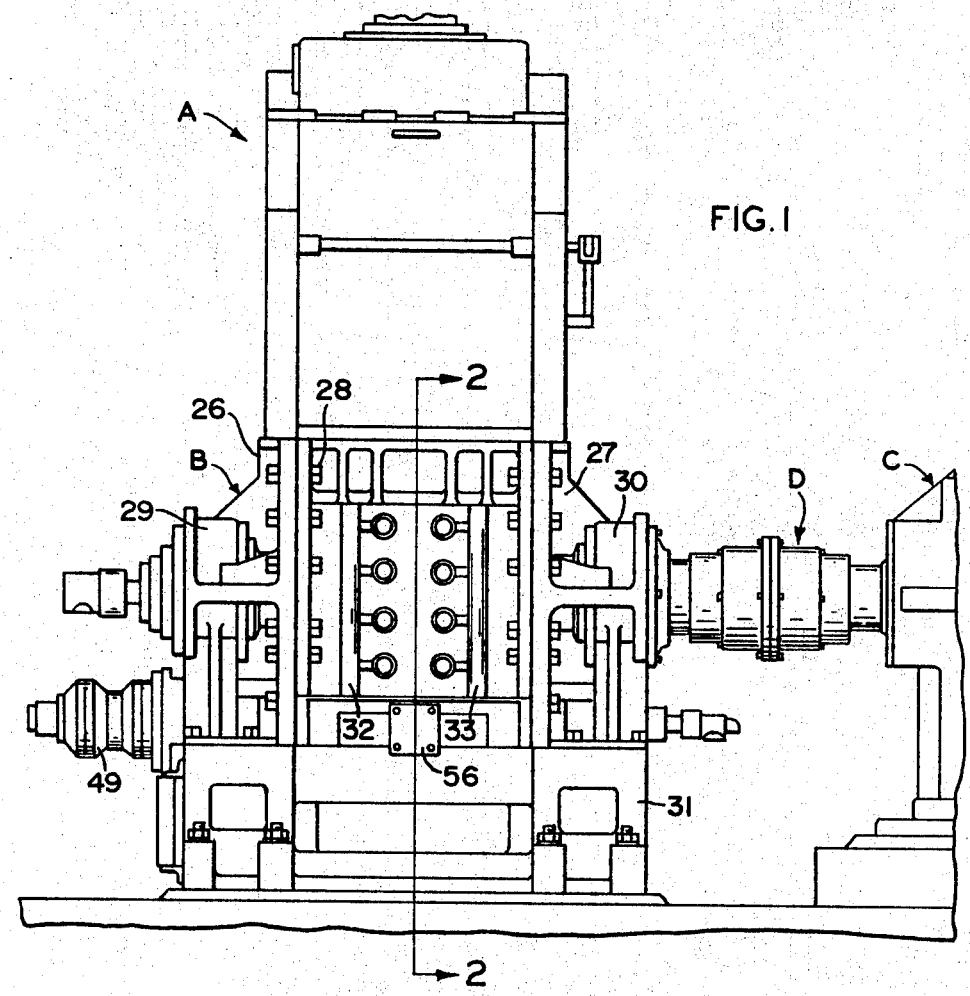
FIG. 1 is a partial side elevational view of a mixing machine embodying the present invention.

With reference to the drawings, a mixing machine embodying the present invention is d indicated generally at A and includes a mixer B in which material such as rubber, plastic or the like is mixed by rotors. A drive unit C, which is a motor driven gear reducer, is connected by couplings D to rotors of the mixer B.

The mixer B includes a mixing chamber 18 in which side-by-side rotors 20, 21 are driven by the drive unit C to mix material contained within the chamber. The mixing chamber 18 is formed by side members 22, 23, which have concave inner walls 24, 25, respectively, and by end frames 26, 27 that are secured to the side members by suitable bolts 28. Journal boxes 29, 30 that are a part of the end frames rotatably support the rotors 20, 21. A suitable base 31 supports the side members and end frames. Headers 32, 33 associated with each side member 22, 23 supply heat exchange fluid to chambers 34 and passages 35 within the side members to control the temperature of the side members. An upper charging opening 37 and a lower discharge opening 38 to the chamber 18 provide for the introduction of material to be mixed and the removal of mixed batches, respectively.

The discharge opening 38 extends longitudinally substantially between the end frames 26, 27 and is generally rectangular in shape. It includes a peripheral seat 40 that is tapered inwardly in an upward direction along longitudinally extending portions. During charging and mixing of material, the opening 38 is closed by a pivoted discharge door mechanism 42 which is a steel casting and includes a closure portion or door 44 that is received within the opening 38 and which fits tightly against the seat 40 and a curved supporting portion 46 that connects the closure portion 44 to a horizontal pivot shaft 48, which is rotated by a rotary fluid actuator 49. The door mechanism 42 further includes an extending locking portion 52 that cooperates with a slidable latch 54 that holds the door mechanism in a closed position and which is operated by a fluid cylinder 56.

Figure 4:
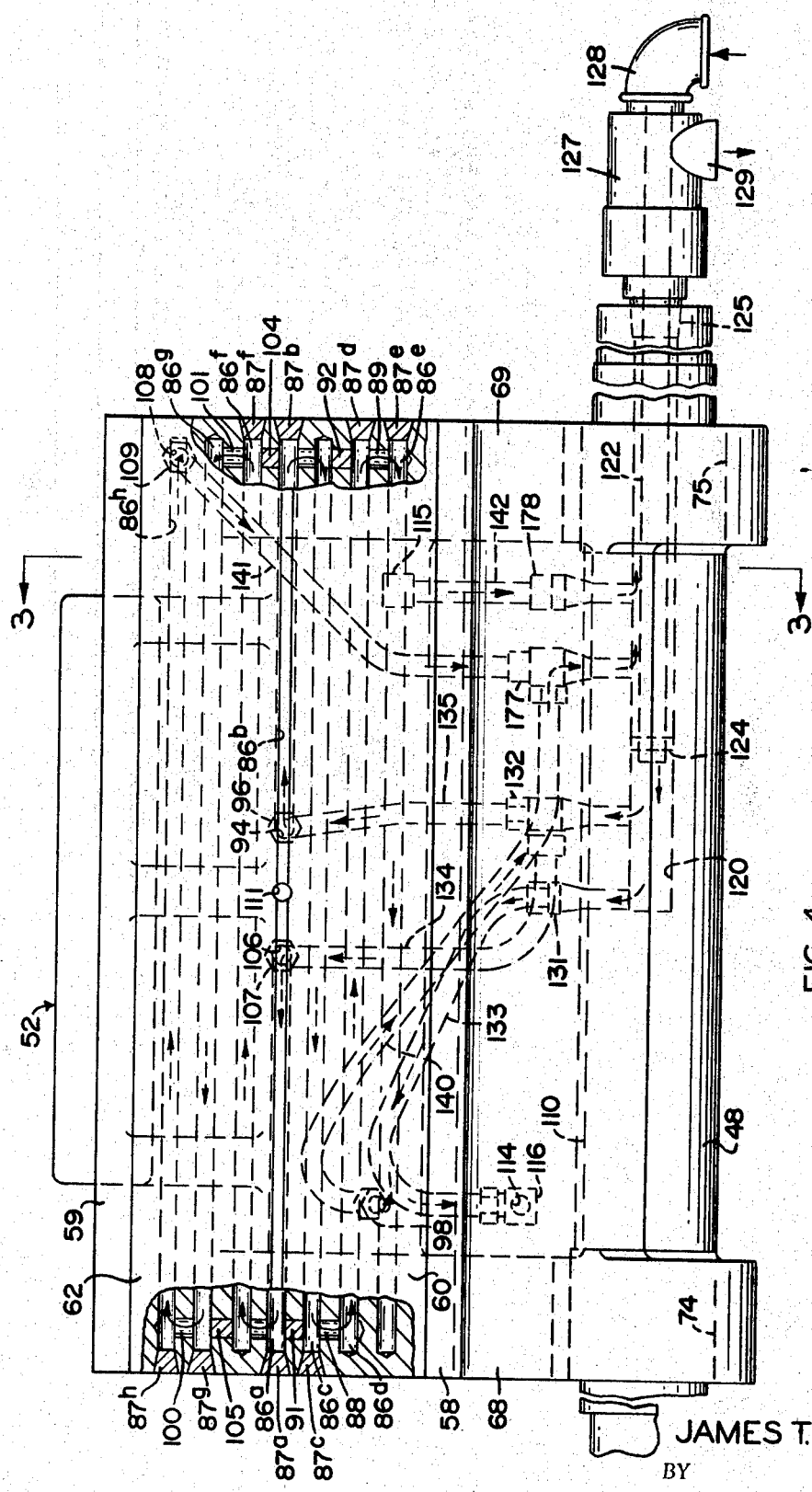
FIG. 4 is a plan view of the discharge door viewed from the plane indicated by the line 4-4 in FIG. 3 and looking in the direction of the arrows.

The closure portion 44 of the discharge door mechanism 42 is of suitable size and shape for closing the discharge opening 38. It is generally rectangular in plan as shown in FIG. 4 and has oppositely sloping and downward diverging flat portions 58, 59 along opposite sides for engaging tapered portions of the seat 40, so that the chamber 18 is tightly closed when the door is pivoted to an upper position and tightly wedged into the opening 38. Upwardly converging cylindrical surfaces 60, 62 of the door extend from the sloping portions 58, 59 and terminate at a flat apex 64. The surfaces 60, 62, 64 form a lower part of the inside surface of the mixing chamber 18.

Figure 2:
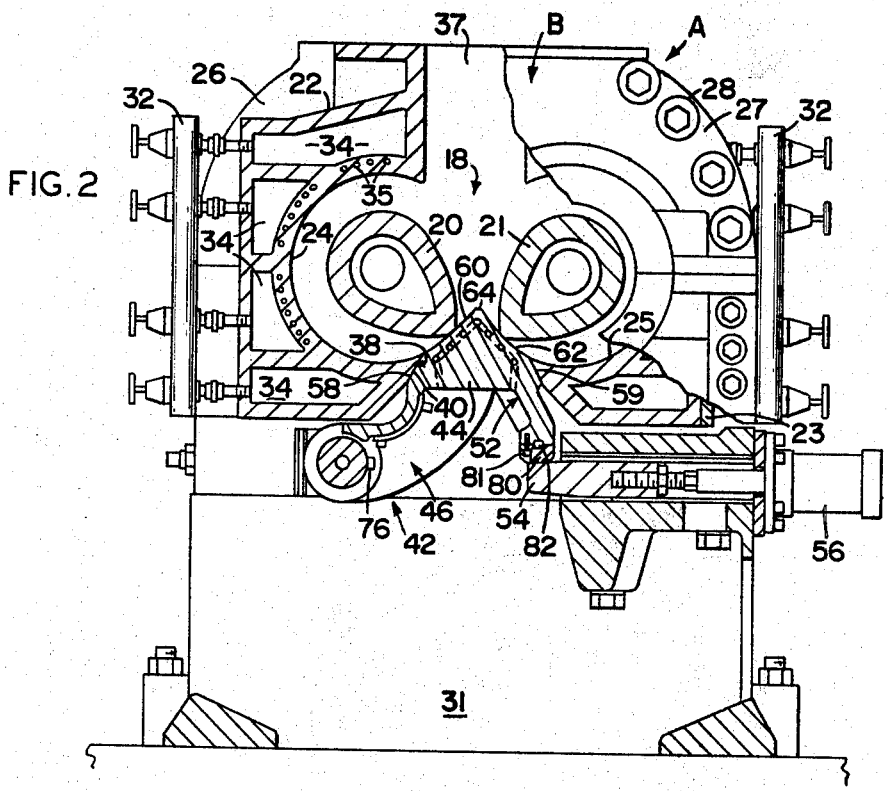
FIG. 2 is in part an end view and in part a transverse sectional view of the mixing machine of FIG. 1 taken approximately along the line 2-2.

The curved supporting portion 46 of the discharge door mechanism 42 includes two spaced arms 68, 69, one at each opposite end of the closure portion 44, that extend transversely from a longitudinal side of the closure portion 44 adjacent to the sloping portion 58. A curved web portion 72 extends from the same longitudinal side of the closure portion between the two arms 68, 69. Each arm 68, 69 includes an opening 74, 75 at the distal end for receiving the pivot shaft 48. The arms are suitably secured to the shaft 48 against relative rotation, as by keys, one of which is shown at 76 in FIG. 2.

The locking portion 52 of the discharge door mechanism 42 includes a downwardly directed side member 78 at the side of the closure portion 44 adjacent the sloping surface 59. A shoe 80 is secured to the lower end of the side member 78 by screws 81 and a key 82. The shoe 80 rests on the sliding latch 54 when the closure portion 44 of the door mechanism is seated in the opening 38.

In order to most efficiently control the temperature of the material in the mixing chamber 18, the discharge door mechanism 42 is provided with passageways for the circulation of heat transfer fluid through both the closure portion 44 and the supporting portion 46. The passageways are particularly constructed and arranged to efficiently transfer heat absorbed by the discharge door mechanism from the material within the chamber 18 so that temperature of the material can be rapidly and effectively controlled.

Figure 3:
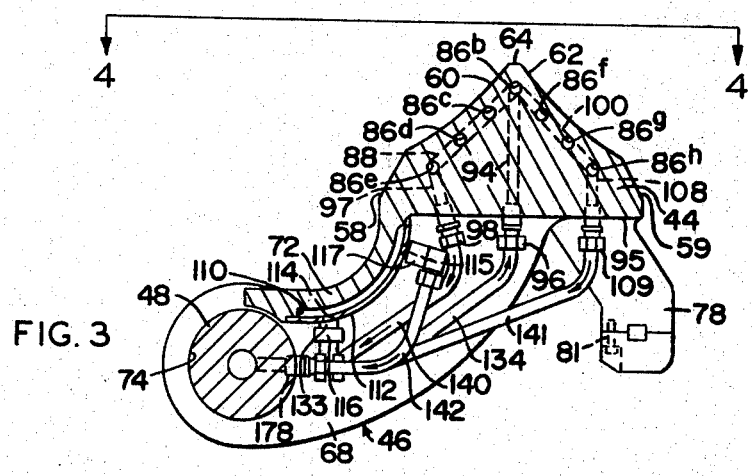
FIG. 3 is an enlarged detail sectional view of the door construction of the mixing machine, taken along the line 3-3 of FIG. 4.

As best shown in FIGS. 3 and 4, a plurality of drilled parallel passageways 86 extend longitudinally within the closure portion 44 of the discharge door mechanism 42. The passageways 86 are located directly beneath and closely adjacent to the cylindrical surfaces 60, 62. Because these passageways are drilled, they can be accurately located close to the surfaces 60, 62 to maximize heat transfer from material within the chamber 18. Also, because the passageways 86 are drilled, they have a smooth machined finish, which minimizes their resistance to the flow of heat transfer fluid. Drilled passageways 86 can be located approximately one-half the distance from the surface 60, 62 as comparable cored holes could be located, due to the greater accuracy with which they can be located. In order to maximize heat transfer, the passageways are accurately located parallel to each other no more than approximately 1 inch from the surfaces 60, 62 and preferably approximately one-half inch, therefrom. By comparison, cored holes typically must be nominally at least 1¾ inches from the surfaces.

In the preferred embodiment shown, there are parallel passageways 86 extending longitudinally beneath the surfaces 60, 62, 64. Two passageways 86a, 86 b are located directly beneath the apex surface 64 and are axially alined and separated from each other at the center of the closure portion 44. The remaining passageways 86 extend substantially the full length of the closure portion 44, passageways 86c, d and e underlying the surface 60 and passageways 86f, g and h underlying the surface 62. As shown in FIG. 4, each passageway 86 is a blind hole drilled from one side of the closure portion 44 and closed at the open end by a plug 87a, b, c, d, e, f, g, h, respectively.

Transverse passageways 88, 89 are drilled at opposite ends of the closure portion 44 beneath the surface 60, connecting opposite ends of drilled passageways 86 that underlie the surface 60. That is, a transverse passageway 88 connects the three longitudinally extending passageways 86a, 86c, and 86d and a transverse passageway 89 connects longitudinal passageways 86b, 86c, 86d, and 86e. A plug 91 is located in the transverse passageway 88 between the longitudinal passageways 86a and 86c to isolate the passageway 86a from the other passageways beneath the surface 60. A plug 92 is located in the transverse passageway 89, between the longitudinal passageways 86c and 86d. As a result, as indicated by the flow arrows in FIG. 4, the longitudinal passageways 86b, c, d and e are connected in series. A transverse passageway 94 extends from a back or lower surface 95 of the closure portion 44, centrally of the closure portion to the inner end of the passageway 86b and a fitting 96 provides an inlet port to the series of connected passageways 86b, c, d and e. Another transverse passageway 97 (FIG. 3) extends from the back surface 95 to the passageway 86e near the end farthest from the inlet and a fitting 98 at the outer end of the passageway 97 provides a discharge port for the passageways 86b, c, d and e.

Transverse passageways 100, 101 are drilled at opposite ends of the closure portion 44 beneath the surface 62, connecting opposite ends of drilled passageways 86 that underlie the surface 60. That is, a transverse passageway 100 connects the four longitudinally extending passageways 86a, f, g and h and a transverse passageway 101 connects longitudinal passageways 86b, f and g. A plug 104 is located in transverse passageway 101 between the longitudinal passageway 86b and 86f to isolate the passageway 86b from the other passageways beneath the surface 62. A plug 105 is located in the transverse passageway 100 between the longitudinal passageways 86f and 86g. As a result, as indicated by the flow arrows in FIG. 4, the longitudinal passageways 86a, f, g and h are connected in series and are isolated from the passageways 86b, c, d and e. A transverse passageway 106 parallel to the passageway 94 extends from the back surface 95 to the inner end of the passageway 86a and a fitting 107 provides an inlet port to the series connected passageways 86a, f, g and h. Another transverse passageway 108 extends from the back surface 95 to the end of the passageway 86h farthest from the inlet and a fitting 109 at the outer end of the passageway 108 provides a discharge port for the passageways 86a, f, g and h. A thermocouple 111 is located at the surface 64 between the alined passageways 86a and 86b in a throughbore that extends from the back surface 95 to the narrow surface 64 parallel to and between the transverse passageways 94 and 106, to sense the temperature at the inside surface of the discharge door so that the circulation of heat transfer fluid can properly be controlled.

The curved web portion 72 that extends from one side of the closure portion 44 of the discharge door mechanism has a recess 110 in the lower, convexly curved, surface. See FIG. 3. The recess 110 extends substantially the entire length and width of the web and is covered by a curved plate 112 that is welded or otherwise suitably secured and sealed to the web to form a chamber. The curved cover plate 112 has apertures 114, 115 which fittings 116, 117 respectively, are secured. As shown in FIGS. 3 and 4, the aperture 114 is located adjacent one corner of the chamber and the aperture 115 is located generally diagonally therefrom adjacent another corner of the chamber so that heat exchange fluid circulated through the chamber formed by the recess 110 and cover plate 112, from the aperture 114 to the aperture 115 circulates across essentially the entire recessed surface and controls the temperature of the web 72.

The pivot shaft 48, which supports the closure mechanism 42, includes an axial bore 120 for carrying heat exchange fluid to and from the door, in the manner of a header. A smaller diameter fluid supply tube 122 is received in the axial bore 120 and terminates short of the end of the bore. The supply tube 122 is supported concentrically within the axial bore 120 by a bushing 124 which also serves to divide the axial bore into two axially spaced chambers, and by a fitting 125 at the outer end of the axial bore 120. A rotary union 127 is carried by the outer end by the shaft 48 and connects the supply tube 122 and the surrounding passageway formed by the bore 120 with an inlet fitting 128 and an outlet fitting 129 for supplying heat transfer fluid to and exhausting heat transfer fluid from the discharge door mechanism. Fittings 131, 132 along the shaft 48 communicate with the axial bore 120 beyond the bushing 124 and are connected to conduits 133, 134, 135 that are connected to the inlet fittings 116, 107, and 96, respectively, of the closure portion 44. Heat exchange fluid supplied through the supply tube 122 flows through the shaft fittings 131, 132 to the drilled passageways 86 in the closure portion 44. Fittings 177, 178 along the shaft 48 communicate with the axial bore 120 on the opposite side of the bushing 124 from the fittings 131, 132 and are connected to conduits 140, 141, 142 that are connected to outlet fittings 98, 109 and 115, respectively. Exhaust fluid received through the shaft fittings 177, 178 from the drilled passageways 86 is carried by the passageway formed by the axial bore 120 surrounding the supply tube 122, to the rotary union 127 and exhausted through the outlet fitting 129.

It will be apparent from the above structure that heat exchange fluids supplied to the discharge door mechanism through the pivot shaft 48 is independently circulated through three different zones, i.e., beneath the surface 60, beneath the surface 62, and beneath the web portion 72. From the construction of the passageways beneath the surfaces 60, 62, the flow of heat exchange fluid is required to traverse back and forth substantially the full length of the closure portion 44 through the series connected, longitudinally extending, passageways before it is discharged through the outlet passageway to the pivot shaft 48. The flow of heat exchange fluid through the cavity formed by the recess 110 must also traverse the full length and also the width of the cavity from the inlet port 114 to the discharge port 115, assuring that the temperature of the web portion 72 is controlled. This is especially important because the web portion, being integrally connected to the closure portion 44, acts as a heat sink and can have a substantial effect upon the temperature of the closure portion.

Because of the relatively long and tortuous path that the heat transfer fluid must travel beneath the surfaces 60, 62 in traversing the passageways 86, it is important that the resistance to flow be kept to a minimum so that high velocity and therefore high volume fluid flow can be obtained with small passageways. This is achieved in the present invention by the use of the drilled passageways, which have smooth machined finished walls, and by connecting the two separate groups of passageways, as described, in parallel with the source of heat exchange fluid. Not only is there a high rate of heat exchange between the surfaces 60, 62 and the fluid moving through the passageways 86 because of the extremely close location of the passageways to the surfaces 60, 62, but also any change in fluid temperature quickly affects the material within the mixing chamber.

From the foregoing description and the accompanying drawings it will now be apparent that this invention provides a novel construction for a mixing machine and more particularly a novel and improved discharge door that provides efficient temperature control through improved heat exchange characteristics as compared with presently known structures. The present invention thereby facilitates the use of higher input power to mixers, with the accompanying increase in heat generated thereby.

Although a preferred embodiment of the present invention has been described with particularity, it will be understood that various modifications or alterations may be made therein without departing from the spirit and scope of the invention, as set forth in the appended claims.

I claim:

1. In apparatus for mixing rubber, plastic and the like, housing means providing a mixing chamber with a discharge opening, a door pivotally secured by a shaft to the housing means for closing said discharge opening, said door being constructed of cast steel and having a solid body portion at least partially receivable in said discharge opening with two converging surface portions that in part form the mixing chamber, a plurality of straight passageways extending within the door located closely adjacent to said surface portions, each straight passageway being uniformly spaced along its length from the adjacent surface portion, and the inside surface of each passageway having a smooth machined finish, connecting passageways within the door extending between ends of adjacent ones of said straight passageways to connect a plurality of said straight passageways in series, means separating the passageways into two sections of series connected passageways each of said section associated with a different one of said two converging surface portions, axial passages in said shaft for supplying and exhausting heat exchange fluid to and from the passageways of said door, and two inlet conduits between said axial passages and the door for separately supplying fluid to the two sections, and an outlet conduit between each section and an axial passageway for exhausting fluid from said sections.

2. A discharge door for a mixing machine of the type used to mix rubber, plastic or the like, said door including an elongated closure portion at least partially receivable in a discharge opening of a mixing machine and a curved supporting portion integral with an extending from said closure portion, said supporting portion including two spaced arms for connecting the door to a door shaft and a curved web portion between said arms, said arms and web portion extending from adjacent one longitudinal edge of the closure portion, said closure portion having two cylindrically curved surfaces that extend longitudinally of the closure portion, a plurality of drilled passageways extending longitudinally within the closure portion closely adjacent the curved surfaces so that the wall thickness of the closure portion between the passageway and the adjacent curved surface is not more than 1 inch, the surface of each passageway having a machined finish, drilled connecting passageways within the closure portion extending between ends of adjacent ones of said longitudinally extending drilled parallel passageways adjacent opposite ends of said closure portion to interconnect passageways that lie beneath the cylindrical surfaces, plugs in said connecting passageways located to establish series flow of fluid through the longitudinally extending passageways beneath each cylindrical surface, transverse passageways extending within the closure portion between spaced alined passageways and ports at an outside surface of the closure portion to supply and exhaust heat exchange fluid to the passageways beneath the cylindrical surfaces, a recess in a surface of said curved web portion extending substantially across the entire distance between said two spaced arms and substantially across the width of the web portion, a cover plate secured to the web portion over said recess forming a chamber, and spaced inlet and outlet ports to said chamber.

3. A discharge door for a mixing machine of the type used to mix rubber, plastic or the like, said door including an elongated closure portion at least partially receivable in a discharge opening of a mixing machine and a curved supporting portion integral with and extending from said closure portion, said supporting portion including two spaced arms for connecting the door to a door shaft and a curved web portion between said arms, said arms and web portion extending from adjacent one longitudinal edge of the closure portion, said closure portion having two cylindrically curved surfaces that converge and terminate in a narrow flat surface extending longitudinally of the closure portion, a plurality of blind, drilled, parallel passageways extending longitudinally within the closure portion each from one end surface of the closure portion and closely adjacent the curved surfaces so that the wall thickness of the closure portion between the passageway and the adjacent curved surface is not more than 1 inch, the surface of each passageway having a machined finish, plugs closing each passageway at the end surface through which it extends, drilled connecting passageways within the closure portion extending between ends of adjacent ones of said longitudinally extending drilled parallel passageways adjacent opposite ends of said closure portion to separately interconnect the passageways that lie beneath each cylindrical surface, plugs in said connecting passageways located to establish series flow of fluid through the longitudinally extending passageways beneath each cylindrical surface, two separate passageways longitudinally alined adjacent said narrow flat surface of the closure portion and separated centrally of the longitudinal extent of the closure portion, each communicating at its respective outer end with an adjacent passageway associated with a different one of said cylindrical surfaces, first and second transverse passageways each extending within the closure portion between an inner end of one of the separate alined passageways and a port at an outside surface of the closure portion, third and fourth transverse passageways each extending within the closure portion beneath each cylindrical surface between an end of a parallel passageway which is remote from the inner end of a serially associated separate alined passageway and a port at an outside surface of the closure portion, a recess in a surface of said curved web portion extending substantially the entire distance between said two spaced arms and substantially across the width of the web portion, a cover plate secured to the web portion over said recess forming a chamber, and spaced inlet and outlet ports to said chamber.

4. A discharge door for a mixing machine of the type used to mix rubber, plastic or the like, said door including an elongated closure portion at least partially receivable in a discharge opening of a mixing machine and a curved supporting portion integral with and extending from said closure portion said supporting porting including two spaced arms for connecting the door to a door shaft and a curved web portion between said arms said arms and web portion extending from adjacent one longitudinal edge of the closure portion, said closure portion having two cylindrically curved surfaces that converge and terminate in a narrow flat surface extending longitudinally of the closure portion, a plurality of blind, drilled, parallel passageways extending longitudinally within the closure portion each from one end surface of the closure portion and closely adjacent the curved surfaces so that the wall thickness of the closure portion between the passageway and the adjacent curved surface is not more than 1 inch, the surface of each passageway at the end surface through which it extends, drilled connecting passageways within the closure portion extending between ends of adjacent ones of said longitudinally extending drilled parallel passageways adjacent opposite ends of said closure portion to separately interconnect the passageways that lie beneath each cylindrical surface, plugs in said connecting passageways located to establish series flow of fluid through the longitudinally extending passageways beneath each cylindrical surface, two separate passageways longitudinally alined adjacent said narrow flat surface of the closure portion and separated centrally of the longitudinal extend of the closure portion, each communicating at its respective outer end with an adjacent passageway associated with a different one of said cylindrical surfaces, first and second transverse passageways each extending within the closure portion between an inner end of one of the separate alined passageways and a port at an outside surface of the closure portion, third and fourth transverse passageways each extending within the closure portion beneath each cylindrical surface between an end of a parallel passageway which is remote from the inner end of a serially associated separate alined passageway and a port at an outside surface of the closure portion, a throughbore in the closure portion extending from an outside surface thereof through the narrow flat surface, located in part between the separate longitudinally alined passageways, a thermocouple located in part between the within said throughbore, a recess in a surface of said curved web portion extending substantially the entire distance between said two spaced arms and substantially across the width of the web portion, a cover plate secured to the web portion over said recess forming a chamber and spaced inlet and outlet ports to said chamber and conduits extending outside said closure portion from said ports to a fluid supply and exhaust header.

5. A discharge door for a mixing machine of the type used to mix rubber, plastic or the like, said door including an elongated closure portion at least partially receivable in a discharge opening of a mixing machine and a curved supporting portion integral with and extending from said closure portion, said supporting portion including two spaced arms for connecting the door to a door shaft and a curved web portion between said arms, said arms and web portion extending from adjacent one longitudinal edge of the closure portion, said closure portion having two cylindrically curved surfaces that extend longitudinally of the closure portion, a plurality of drilled passageways extending longitudinally within the closure portion closely adjacent the curved surfaces, transverse passageways extending within the closure portion between spaced alined passageways and ports at an outside surface of the closure portion to supply and exhaust heat exchange fluid to the passageways beneath the cylindrical surfaces, a recess in a surface of said curved web portion extending substantially the entire distance between said two spaced arms and substantially across the width of the web portion, a cover plate secured to the web portion over said recess forming a chamber, and spaced inlet and outlet ports to said chamber.

6. A discharge door for a mixing machine of the type used to mix rubber, plastic or the like, said door including an elongated closure portion at least partially receivable in a discharge opening of a mixing machine and a supporting portion integral with and extending from said closure portion, said supporting portion including two spaced arms for connecting the door to a door shaft, said closure portion having two cylindrically curved surfaces that converge and terminate in a narrow flat surface extending longitudinally of the closure portion, a plurality of blind, drilled, parallel passageways extending longitudinally within the closure portion each from one end surface of the closure portion and closely adjacent the curved surfaces so that the wall thickness of the closure portion between the passageway and the adjacent curved surface is not more than 1 inch, the surface of each passageway having a machined finish, plugs closing each passageway at the end surface through which it extends, drilled connecting passageways within the closure portion extending between ends of adjacent ones of said longitudinally extending drilled parallel passageways adjacent opposite ends of said closure portion to separately interconnect the passageways that lie beneath each cylindrical surface, plugs in said connecting passageways located to establish series flow of fluid through the longitudinally extending passageways beneath each cylindrical surface, two separate passageways longitudinally alined adjacent said narrow flat surface of the closure portion and separated centrally of the longitudinal extent of the closure portion, each communicating at its respective outer end with an adjacent passageway associated with a different one of said cylindrical surfaces, first and second transverse passageways each extending within the closure portion between an inner end of one of the separate alined passageways and a port at an outside surface of the closure portion, and third and fourth transverse passageways each extending within the closure portion beneath each cylindrical surface between an end of a parallel passageway which is remote from the inner end of a serially associated separate alined passageway and a port at an outside surface of the closure portion.

PO-1050
(5/69)

UNITED STATES PATENT OFFICE
CERTIFICATE OF CORRECTION

Patent No. 3,545,533            Dated December 8, 1970

Inventor(s) JAMES T. MATSUOKA

It is certified that error appears in the above-identified patent and that said Letters Patent are hereby corrected as shown below:

Column 7, line 12, change "porting" to

--portion--

Signed and sealed this 30th day of March 1971.

(SEAL)
Attest:

EDWARD M.FLETCHER,JR.          WILLIAM E. SCHUYLER,
Attesting Officer                  Commissioner of Patent